(12) United States Patent
Braun et al.

(10) Patent No.: US 7,597,018 B2
(45) Date of Patent: Oct. 6, 2009

(54) PNEUMATIC LINE ISOLATION AND HEATING FOR AIR DATA PROBES

(75) Inventors: Scott Joseph Braun, Lakeville, MN (US); Patrick John Moynihan, Lakeville, MN (US); Timothy Thomas Golly, Lakeville, MN (US); Alexander Nathan Reid, St. Louis Park, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 380 days.

(21) Appl. No.: 11/786,225

(22) Filed: Apr. 11, 2007

(65) Prior Publication Data

US 2008/0250884 A1    Oct. 16, 2008

(51) Int. Cl.
B64D 43/00 (2006.01)
(52) U.S. Cl. .................................. 73/866.5; 73/178 R
(58) Field of Classification Search .............. 73/178 R, 73/866.5
See application file for complete search history.

(56) References Cited

U.S. PATENT DOCUMENTS

| | | | | |
|---|---|---|---|---|
| 3,585,859 A * | 6/1971 | De Leo et al. ................ 73/700 |
| 4,378,696 A | 4/1983 | DeLeo et al. |
| 5,025,661 A * | 6/1991 | McCormack ................ 73/180 |
| 5,319,970 A * | 6/1994 | Peterson et al. ............... 73/182 |
| 5,653,538 A * | 8/1997 | Phillips ....................... 374/138 |
| 6,012,331 A | 1/2000 | Menzies et al. |
| 6,076,963 A | 6/2000 | Menzies et al. |
| 6,134,972 A * | 10/2000 | Streckert et al. ........... 73/861.65 |
| 6,305,218 B1 * | 10/2001 | Foster ........................ 73/178 R |
| 6,550,344 B2 * | 4/2003 | Bachinski et al. .......... 73/861.05 |
| 6,557,243 B2 * | 5/2003 | Feeley et al. ............ 73/866.5 X |
| 6,591,696 B2 * | 7/2003 | Bachinski ................. 73/861.65 |
| 6,622,390 B2 * | 9/2003 | Brusius ........................ 33/286 |
| 6,668,640 B1 | 12/2003 | Alwin et al. |
| 6,892,584 B2 * | 5/2005 | Gilkison et al. ................ 73/736 |
| 6,941,805 B2 * | 9/2005 | Seidel et al. .............. 73/170.02 |
| 6,974,250 B2 * | 12/2005 | Severson ..................... 374/138 |

OTHER PUBLICATIONS

Goodrich Sensor Systems, Goodrich Corporation, "Smartprobe™-Multi-Function Air Data System," 2002, 2 pages.
Goodrich Sensor Systems, Goodrich Corporation, "Pitot and Pitot-Static Probes," 2002, 12 pages.

* cited by examiner

*Primary Examiner*—Thomas P Noland
(74) *Attorney, Agent, or Firm*—Edwards Angell Palmer & Dodge LLP; Scott D. Wofsy; Joshua L. Jones

(57) ABSTRACT

The invention provides a probe for an aircraft including a strut having an interior passage accommodating a plurality of pneumatic lines, a probe head extending from the strut and having at least one inlet opening communicating with the pneumatic lines, a baseplate situated below the strut for attaching the probe to the aircraft, and a manifold situated below the baseplate for communicating with the pneumatic lines, wherein the baseplate is adapted and configured so that the pneumatic lines communicating with the manifold are thermally isolated from the baseplate. The invention also provides a method of thermally isolating at least one pneumatic line in an aircraft probe.

21 Claims, 9 Drawing Sheets

PNEUMATIC LINE ISOLATION AND HEATING FOR AIR DATA PROBES

BACKGROUND OF THE INVENTION

1. Field of the Invention

The present invention relates to an air data probe for aircraft flight control, and more particularly, to a probe for an aircraft having pneumatic lines that are thermally isolated.

2. Description of Related Art

A variety of air data probe devices are known in the art for aircraft flight control. Of such devices, many are directed to measuring pitot pressure, static pressure, local angle of attack pressures, and angle of sideslip pressures as parameters for calculating pressure altitude, altitude rate, airspeed, Mach number, angle of attack, and angle of sideslip. Air data probes can also provide data for secondary purposes including engine control, artificial feel, cabin pressure differential, and more.

Typically, air data probes include digital and/or analog pressure transducers capable of measuring pressures conducted through pneumatic lines with openings external to the aircraft. This usually involves a pitot-static type probe in which one pneumatic line has an opening that faces into the airflow to measure pitot pressure, and a second pneumatic line that faces orthogonal to the airflow to measure static pressure. Similar pneumatic lines can be employed with openings in various other orientations to measure angle of attack, angle of sideslip, atmospheric conditions, and other metrics.

Many aircraft components are negatively affected by icing conditions, and air data probes are no exception. Icing conditions frequently occur at ground level in cold winter weather. In addition, regardless of the season, the flight envelope of modern aircraft typically includes altitudes where air data probes are subject to sub-freezing temperatures. If there is a sufficient amount of moisture in the air, e.g. when the aircraft enters a cloud, moisture and/or ice can accumulate in the pneumatic lines of an unheated air data probe. The accumulation of moisture and ice within the pneumatic lines of an air data probe can hamper the probe's ability to provide accurate measurements. In a worst-case scenario, the pneumatic lines could become completely blocked with ice, rendering the pneumatic probe incapable of providing useful measurements.

In order to combat the negative affects of accumulated moisture and ice within pneumatic lines, it is known to heat the structures of the probe to drive off moisture and ice. For example, an electrical heating element can be arranged within the interior passage of an air data probe to provide heat sufficient to drive off moisture and ice and keep the pneumatic lines clear.

FIGS. 1a and 1b show a probe 10 that is representative of the prior art. Probe 10 includes strut 20 that has an interior passage 24 accommodating a plurality of pneumatic lines 12, which run from inlet openings in a probe head 22 extending from strut 20. Strut 20 has a baseplate 14, which is attached to a thick faceplate 18, which is in turn attached to the aircraft body 80. Each of the pneumatic lines 12 ends at a respective aperture in baseplate 14. From there, pressure is communicated from the pneumatic lines 12 through a plurality of passages 26 in faceplate 18 into manifold 16. An electrically powered heating element 28 is arranged throughout portions of the interior passage 24 and probe head 22 to allay ice and moisture buildup within pneumatic lines 12.

While probe 10 represents the state of the art, the aircraft skin, faceplate 18, and baseplate 14 can still reach freezing temperatures in some conditions. When these structures reach cold enough temperatures, their large thermal masses can render even state of the art heating element 28 ineffective to heat the portions of the pneumatic paths passing through baseplate 14 and faceplate 18. In severe enough temperatures, heating element 28 can thus be inadequate to prevent buildup of moisture and/or ice within the pneumatic lines. In short, even in the best currently available probes, portions of the pneumatic path can still be subject to ice and/or moisture build up in conditions of extreme cold and moisture.

Such conventional methods and systems generally have been considered satisfactory for their intended purpose. However, there remains an ever present need to advance the state of the art for reducing the risk of ice and moisture accumulation in the pneumatic lines of air data probes. There also remains a need in the art for a method and a system that are inexpensive and easy to make and use for reducing ice and moisture formation in the pneumatic lines adjacent to where the probe attaches to the aircraft. The present invention provides a solution for these problems.

SUMMARY OF THE INVENTION

The subject invention is directed to a new and useful air data probe for use in an aircraft. The probe of the invention includes a strut with an interior passage that accommodates pneumatic lines. The probe also includes a probe head extending from the strut and having at least one inlet opening communicating with the pneumatic lines, a baseplate below the strut for attaching the probe to the aircraft, and a manifold below the baseplate for communicating with the pneumatic lines. The baseplate is adapted and configured so that the pneumatic lines communicating with the manifold are thermally isolated from the baseplate.

In accordance with the subject invention, an isolation bore is formed in the baseplate to thermally isolate the pneumatic lines from the baseplate. In one embodiment, the probe further includes a faceplate configured to connect the baseplate to the aircraft. The faceplate includes a second isolation bore aligned with the isolation bore in the baseplate. The faceplate further includes means for connecting the faceplate to the aircraft configured to minimize thermal conduction between the aircraft and the faceplate. The probe can also include a means for heating the pneumatic lines adjacent to the isolation bore in the faceplate. The means for heating preferably self-regulates power consumption.

In another embodiment of the invention, an isolation bracket is provided within the isolation bore of the faceplate for supporting the pneumatic lines. A plurality of support bores are be formed in the isolation bracket, each support bore for supporting a corresponding one of the pneumatic lines. The isolation bracket includes means for heating the pneumatic lines. The means for heating preferably self-regulates power consumption. At least one support bore has a thermally conducting fin extending therefrom for transferring heat to the corresponding one of said pneumatic lines. At least a portion of the isolation bracket can be formed of stainless steel.

In one embodiment of the invention, the manifold and the isolation bracket cooperate to form a sealing interface for the pneumatic lines. The manifold is thermally isolated from the faceplate.

The invention also includes a method for thermally isolating at least one pneumatic line in an aircraft probe. The method includes the step of providing a strut having a probe head extending therefrom and a baseplate for attaching the strut to the aircraft, wherein the strut has an interior passage configured to accommodate at least one pneumatic line. The method also includes the steps of forming an isolation bore in the baseplate to communicate with the interior passage of the strut, positioning at least one pneumatic line within the interior passage of the strut in such a manner so that the at least one pneumatic line communicates with at least one inlet opening in the probe head, and supporting the at least one pneumatic line within the isolation bore to thermally isolate the at least one pneumatic line from the baseplate.

In one embodiment of the method of the invention, the method further includes the steps of providing a faceplate configured and adapted to attach the baseplate to an aircraft and forming a second isolation bore in the faceplate, wherein the second isolation bore is configured to be aligned with the isolation bore in the baseplate to thermally isolate the at least one pneumatic line from the faceplate.

In another embodiment of the method of the invention, the supporting step includes positioning an isolation bracket within the isolation bore of the faceplate to support the at least one pneumatic line. In another embodiment of the invention, the method further includes the steps of providing a manifold for communicating with the at least one pneumatic line, wherein the manifold is configured and adapted to be thermally isolated from the faceplate and the baseplate, and sealing the manifold to the at least one pneumatic line.

These and other features of the probe of the subject invention and the manner of thermally isolating pneumatic lines will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the probe and method of thermally isolating pneumatic lines according to the subject invention without undue experimentation, preferred embodiments thereof will be described in detail hereinbelow with reference to certain Figures, wherein.

DETAILED DESCRIPTION OF THE PREFERRED EMBODIMENT

Figure 1A:
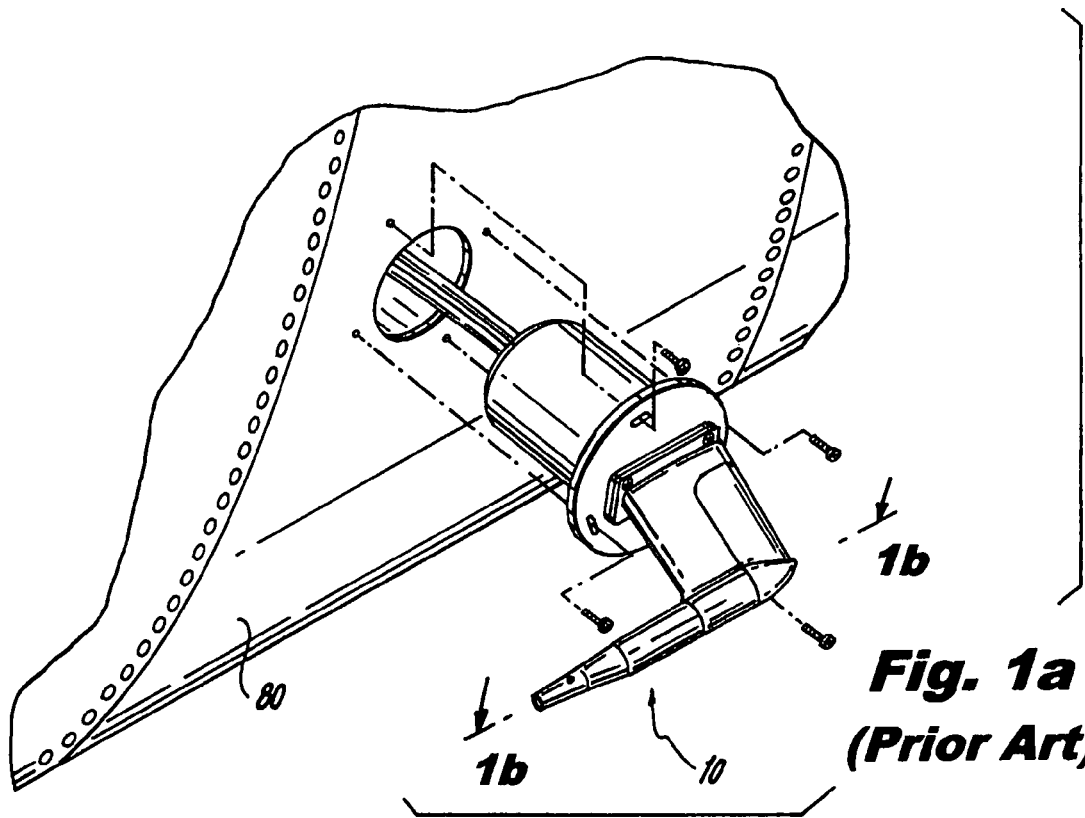
FIG. 1a is a perspective view of a prior art air data probe showing how the probe attaches to an aircraft.

Referring now to the drawings wherein like reference numerals identify similar features or elements of the various embodiments of the subject invention disclosed herein, there is illustrated in FIG. 2 an air data probe 100. Other embodiments of an air data probe in accordance with the invention, or aspects thereof, are provided in FIGS. 3-8, as will be described.

Figure 2A:
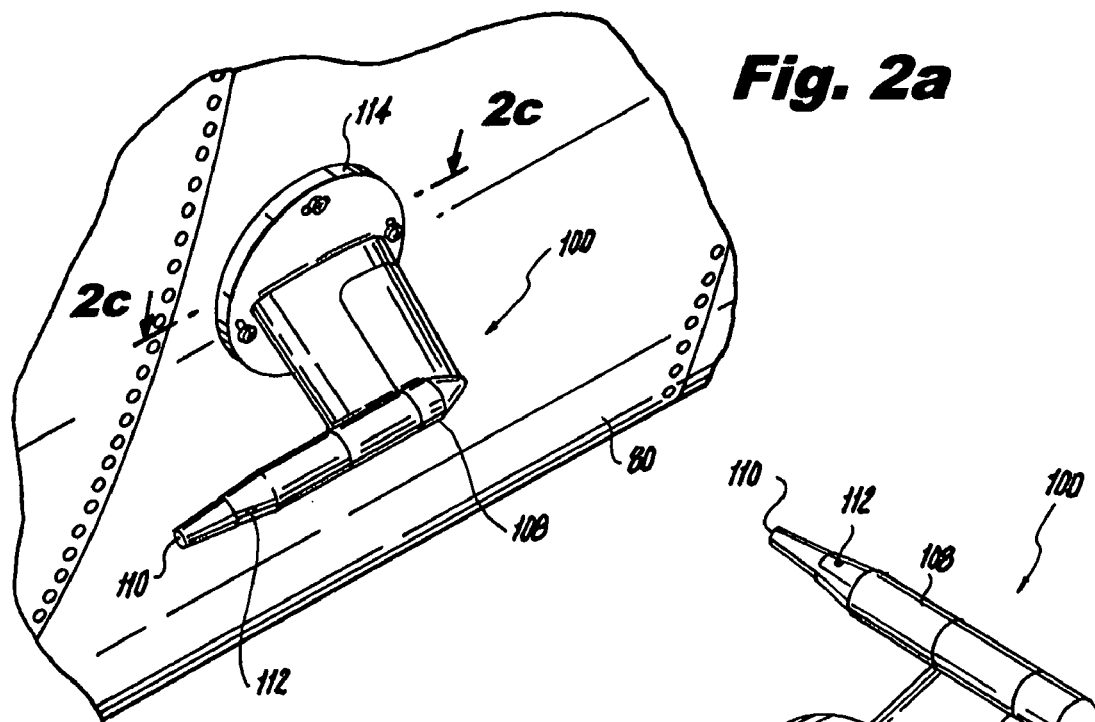
FIG. 2a is a perspective view of a first representative embodiment of an air data probe constructed in accordance with the invention showing the probe attached to an aircraft.
Figure 2B:
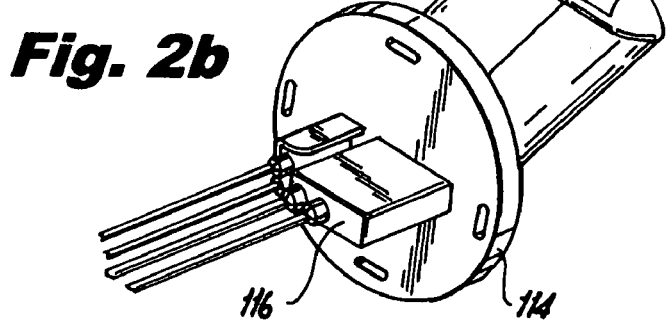
FIG. 2b is a perspective view from below, of the air data probe of FIG. 2a, showing the pneumatic lines and manifold under the baseplate of the air data probe.

As depicted in FIGS. 2a and 2b, probe 100 is provided having a strut 102. Strut 102 is preferably configured and adapted to extend outward from the skin of an aircraft to allow the probe to aerodynamically measure the desired air flow properties outside the aircraft. Strut 102 has an interior passage 104 accommodating a plurality of pneumatic lines 106.

Figure 2C:
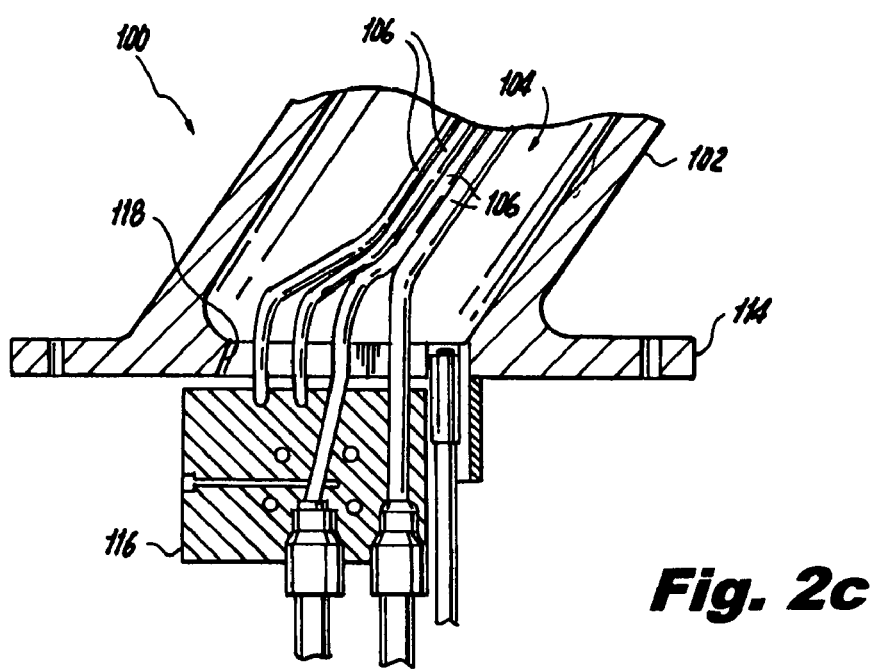
FIG. 2c is cross sectional view of a portion of the air data probe of FIG. 2a, showing the pneumatic lines passing through an isolation bore in the baseplate and connecting directly to the manifold.

Referring now to FIGS. 2a-2c, probe 100 includes probe head 108 extending from strut 102. Probe head 108 has inlet openings that communicate with pneumatic lines 106. Pitot pressure inlet 110 communicates with a pneumatic line for measuring pitot pressure. Additional inlets 112 communicate with other pneumatic lines to measure static pressure or pressures related to angle of attack and angle of sideslip, as is known in the art. Any combination of inlets such as inlets 110, 112 can be used to measure pitot, static, angle of attack, and/or angle of sideslip pressures without departing from the spirit and scope of the invention.

With continuing reference to FIGS. 2a-2c, probe 100 includes baseplate 114 situated below strut 102 for attaching probe 100 to aircraft 80. Manifold 116 is situated below baseplate 114 and communicates pneumatic pressures from pneumatic lines 106 to pressure transducers (not pictured) in order to make measurements indicative of flight control parameters. Baseplate 114 is configured so that the pneumatic lines 106 communicating with manifold 116 are thermally isolated from baseplate 114.

In the embodiment shown in FIGS. 2a-2c, probe 100 is configured to thermally isolate pneumatic lines 106 by having isolation bore 118 defined in the baseplate. Isolation bore 118 openly communicates with interior passage 104 of strut 102. Pneumatic lines 106 are not in direct contact with baseplate 114 due to isolation bore 118. Thus, unlike prior art pneumatic lines 12 (shown in FIG. 1) pneumatic lines 106 are thermally isolated from baseplate 114. Even if baseplate 114 reaches freezing temperatures, pneumatic lines will be more likely to remain free from accumulated moisture and ice than in the prior art.

Those skilled in the art will readily appreciate that a baseplate in accordance with the invention can be configured in a variety of other ways to thermally isolate pneumatic lines 106 from baseplate 114. For example, each pneumatic line could pass through its own bore in baseplate 114, in which the bore is coated with a thermally insulative material. Alternatively, baseplate 118 could have a plurality of isolation bores, each having at least one pneumatic line passing therethrough.

Moreover, those skilled in the art will readily appreciate that manifold 116 is an optional feature and the invention can be practiced with or without a manifold in proximity to the strut. In embodiments where there is no manifold in proximity to the strut, unlike that shown in FIGS. 2b-2c, pneumatic lines 106 can run to pressure fittings at various locations within the aircraft, as is known in the art. Such embodiments also benefit from thermally isolating pneumatic lines 106 as described above, without departing from the spirit and scope of the invention.

Figure 3A:
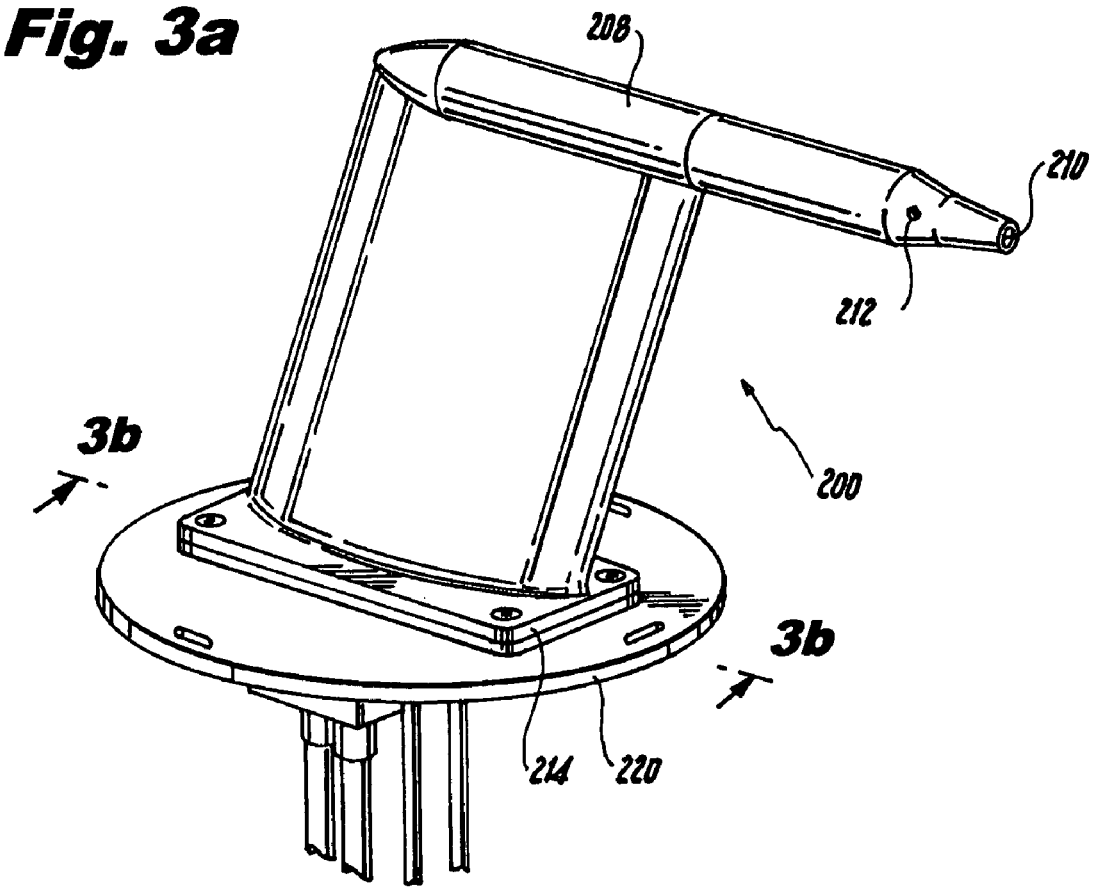
FIG. 3a is a perspective view of a second representative embodiment of an air data probe constructed in accordance with the present invention, showing a faceplate for attaching the baseplate to an aircraft.
Figure 3B:
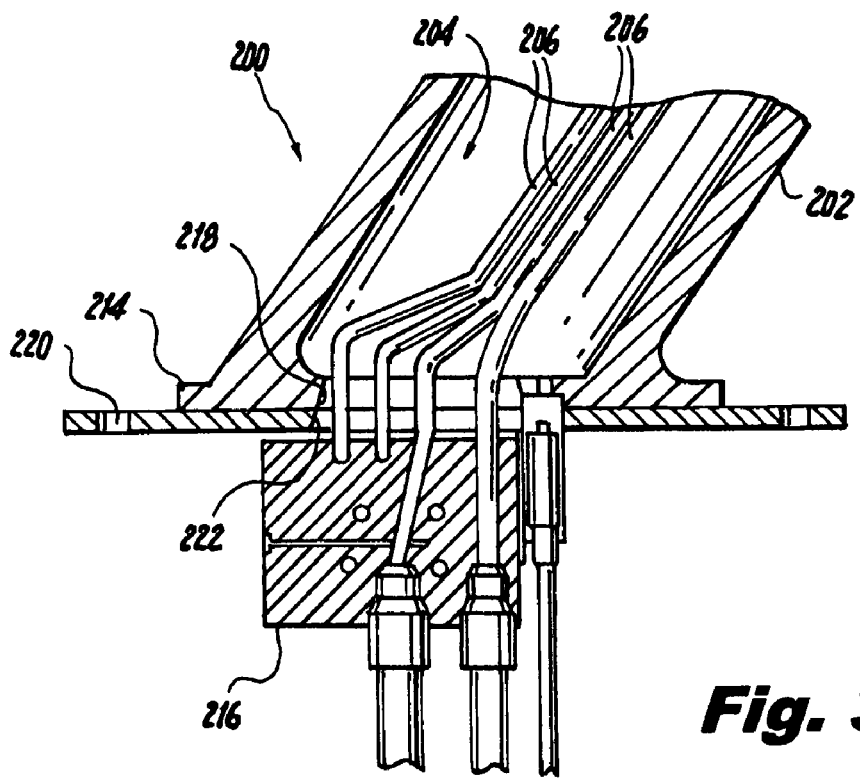
FIG. 3b is a cross sectional view of a portion of the air data probe of FIG. 3a, showing the pneumatic lines passing through an isolation bore in each of the baseplate and faceplate to connect directly with the manifold.

FIGS. 3a-3b depict a probe 200 which includes faceplate 220 for connecting baseplate 214 to the aircraft. Faceplate 220 serves as a connecting interface between the skin of the aircraft, the exterior portions of probe 200, and components of probe 200 that are housed inside the aircraft.

Faceplate 220 includes a second isolation bore 222 aligned with isolation bore 218 in baseplate 214. Isolation bores 218 and 222 allow pneumatic lines 206 to pass from inlets 210 and 212 in probe head 208, through interior passage 204 of strut 202, and into manifold 216 while being thermally isolated from the potentially freezing temperatures in the thermal masses of baseplate 214, faceplate 220, and the skin of the aircraft. Those skilled in the art will readily appreciate that faceplate 220 is an optional feature and that the invention can be practiced with or without a faceplate without departing from the spirit and scope of the invention, as described above with reference to FIGS. 2a-2c for example.

Referring now to FIGS. 4 and 5a-d, a probe 300 is shown, including an isolation bracket 326 for supporting pneumatic lines 306 within isolation bores 318 and 322 in baseplate 314 and faceplate 320, respectively. Isolation bracket 326 serves to provide mechanical support to pneumatic lines 306 while facilitating thermal isolation between pneumatic lines 306 and the thermal masses of baseplate 314 and faceplate 320. As shown in FIGS. 5a-5d and 6, each one of the support bores 328 passing through isolation bracket 326 can accommodate one of the pneumatic lines 306.

As depicted in FIGS. 5a-5d and 6, bracket 326 includes a pocket 330 sized and adapted to hold a heater body 332 (also shown in FIG. 8c) in close proximity to pneumatic lines 306. Heater body 332 is a slab-shaped electrical resistance type heater configured and dimensioned to fit within pocket 330. The broad sides of heater body 332 can be coated with a solderable material, such as silver, to serve as electrodes to which electrical power can be supplied by leads soldered thereto. Heater body 332 can be made of any suitable material known in the art. However, heater body 332 is preferably made of barium titanate due to this material's ability to self-regulate power consumption and thereby maintain a near constant operating temperature. The self-regulation of power in barium titanate allows heater body 332 to draw more power in cold conditions in which heat is required to prevent ice and moisture formation, and to draw less power in warmer conditions to protect nearby electronics from high temperatures. This eliminates the need for heater control circuitry.

While the particulars of heater body 332 have been described above, it will be readily apparent to those skilled in the art that the particulars of heater body 332 can be widely varied without departing from the spirit and scope of the invention. For example, besides coating with a solderable material so leads can be soldered to the heater body, there are numerous other ways to deliver power to a heater body in accordance with the invention. Further, while heater body 332 is preferably made of a material that self-regulates power consumption, the invention can readily be practiced with a constant power heater implementing control circuitry. Those skilled in the art will readily appreciate how to vary the location and shape of the heater body, the number of heater bodies, and indeed the presence or lack of a heater body without departing from the spirit and scope of the invention.

As best seen in FIGS. 5a-5d and 6, isolation bracket 326 has three sets of fins 324 that are essentially extensions of three support bores 328 that only partially surround their respective pneumatic lines 306. Fins 324 are located between heater body 332 and pneumatic lines 306 and facilitate the conduction of heat therebetween, as indicated by arrows in FIG. 6. While isolation bracket 326 is shown with three sets of fins 324, any number of fins could be used without departing from the spirit and scope of the invention.

Isolation bracket 326 can be made from any suitable material, however, preferable material properties include thermal conductivity high enough to allow for adequate heat conduction between heater body 332 and pneumatic lines 306, thermal conductivity low enough to impede heat transfer with baseplate 314 and faceplate 320, high strength for supporting pneumatic lines 306, and the ability to be brazed or otherwise joined to strut 302 and pneumatic lines 306 to form hermetic seals. Examples of materials with such properties include stainless steel 304 under either ASTM A-276 or ASTM A-167, however those skilled in the art will readily appreciate that other suitable materials can be used in accordance with the invention.

Figure 4:
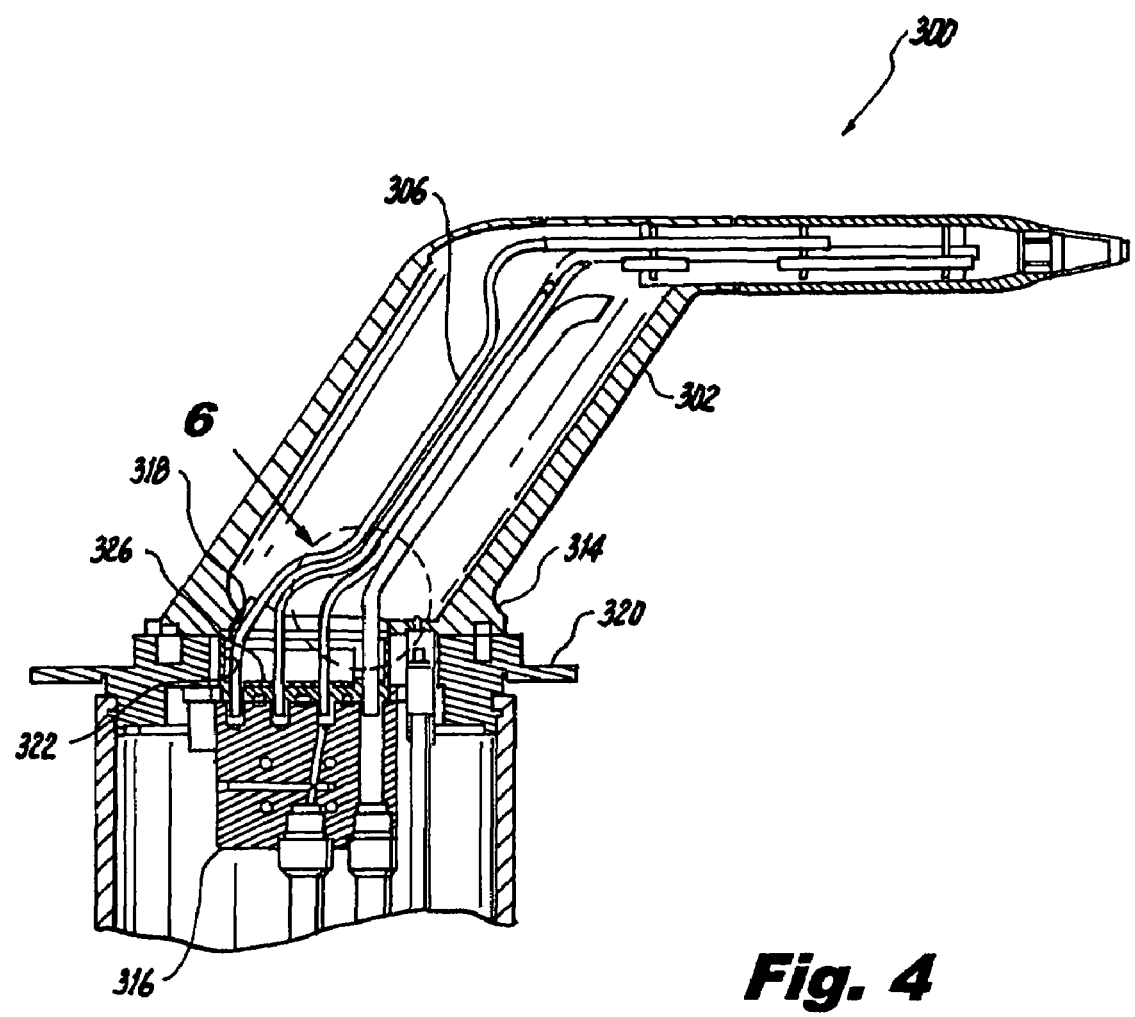
FIG. 4 is a cross sectional view of a third representative embodiment of an air data probe constructed in accordance with the present invention, showing an isolation bracket supporting the pneumatic lines within the isolation bores of the faceplate and baseplate.
Figure 5A:
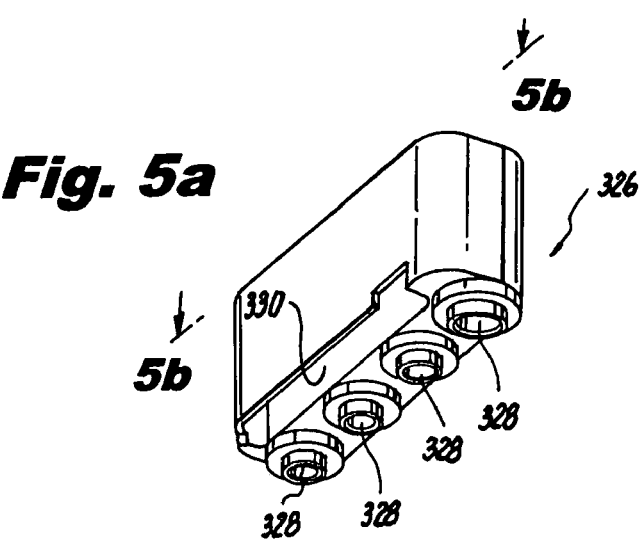
FIG. 5a is a perspective view of the isolation bracket shown in FIG. 4, which includes four support bores, each configured to support a pneumatic line, and a pocket for holding a heater body near the pneumatic lines in the support bores.
Figure 5B:
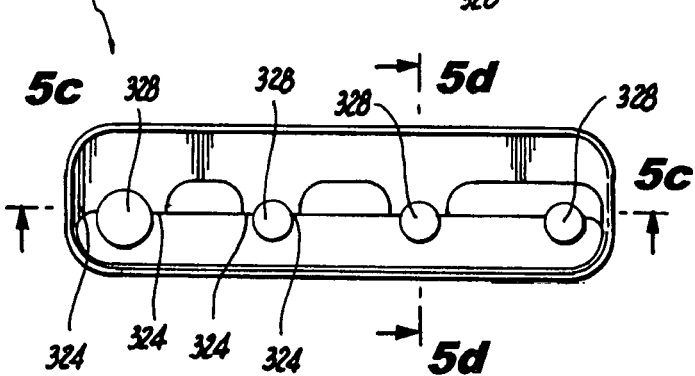
FIG. 5b is an end view of the isolation bracket of FIG. 5a, showing the isolation bores and fins for transferring heat into the pneumatic lines.
Figure 5C:
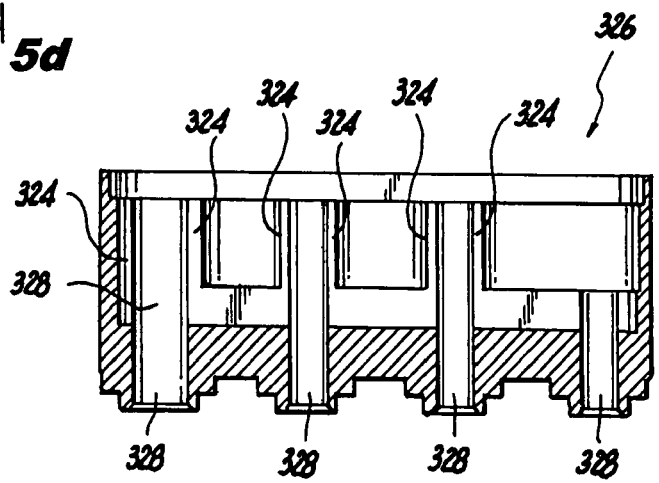
FIG. 5c is a cross sectional view of the isolation bracket of FIG. 5a, showing how the fins extend from the isolation bores.
Figure 5D:
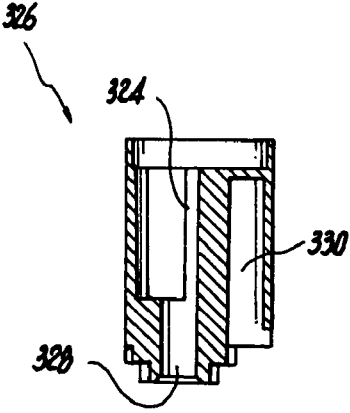
FIG. 5d is a cross sectional view of the isolation bracket of FIG. 5a, showing how the fins cooperate with the heater pocket to facilitate heat transfer between a heater body in the pocket and pneumatic lines in the isolation bracket.
Figure 7A:
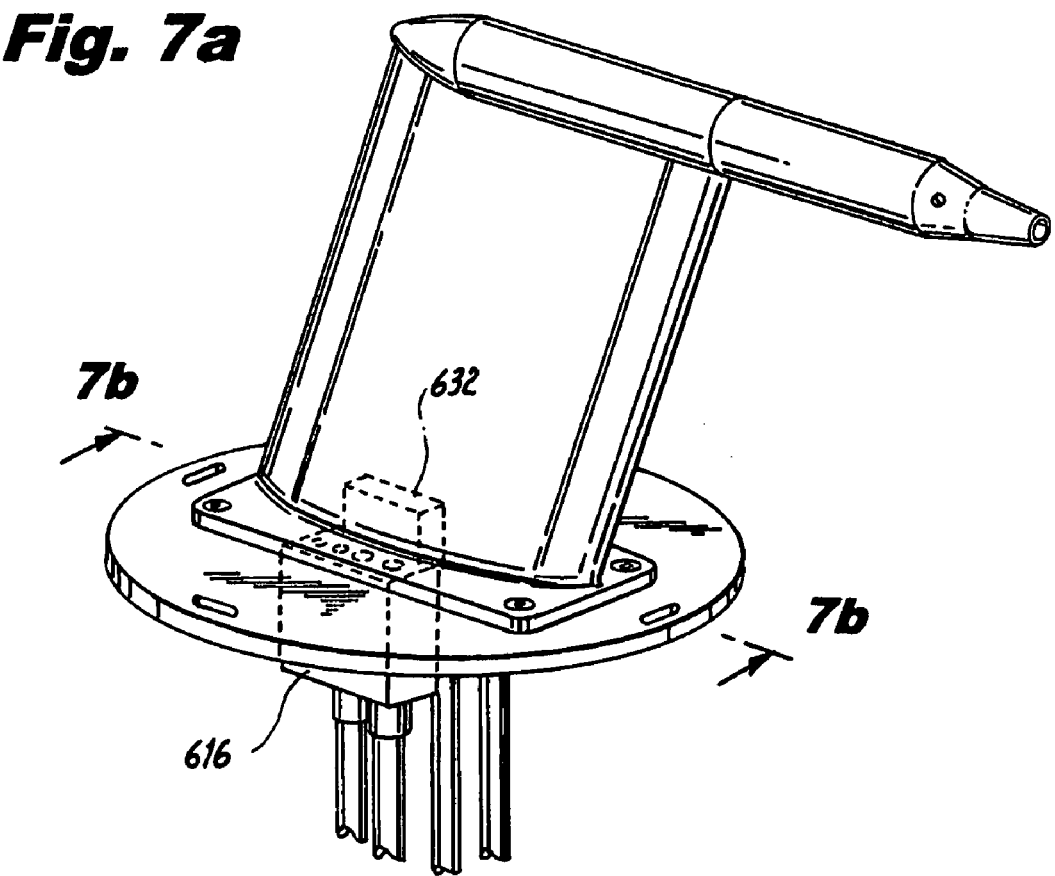
FIG. 7a is a perspective view of a third embodiment of an air data probe constructed in accordance with the present invention, showing a heater body in the isolation bore without an isolation bracket supporting the pneumatic lines.
Figure 7B:
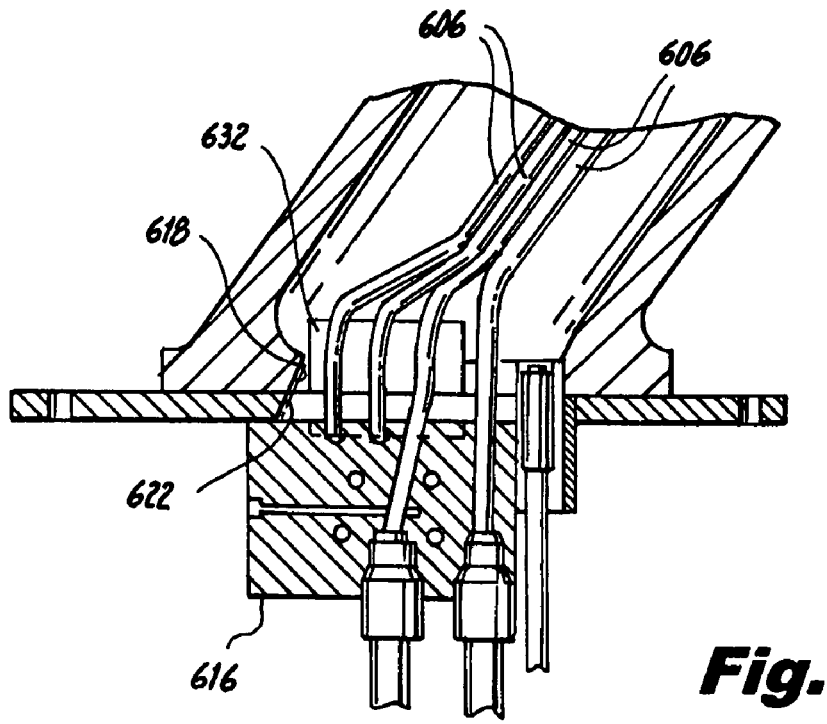
FIG. 7b is a cross sectional view of a portion of the air data probe of FIG. 7a, showing the proximity of the heater body to portions of the pneumatic lines in the isolation bores of the faceplate and baseplate.

Referring now to FIG. 4, manifold 316, isolation bracket 326, and pneumatic lines 306 are preferably dimensioned and adapted to form a sealing interface, allowing pneumatic pressure to be reliably communicated from pneumatic lines 306 into manifold 316. It is also preferable that manifold 316 be arranged within isolation bores 318 and 322 (see FIGS. 8c and 8d) in such a way as to be thermally isolated from baseplate 314 and faceplate 320. It is also contemplated that heating means such as heater body 332, or alternatively the state of the art heating elements within strut 302, could be employed to heat pneumatic lines 306 without using an isolation bracket, as shown in FIGS. 7a and 7b. In such an embodiment, pneumatic lines 606 would pass directly into manifold 616 within isolation bores 618 and 622 without being supported by an isolation bracket, with or without heater body 632 present.

Figure 6:
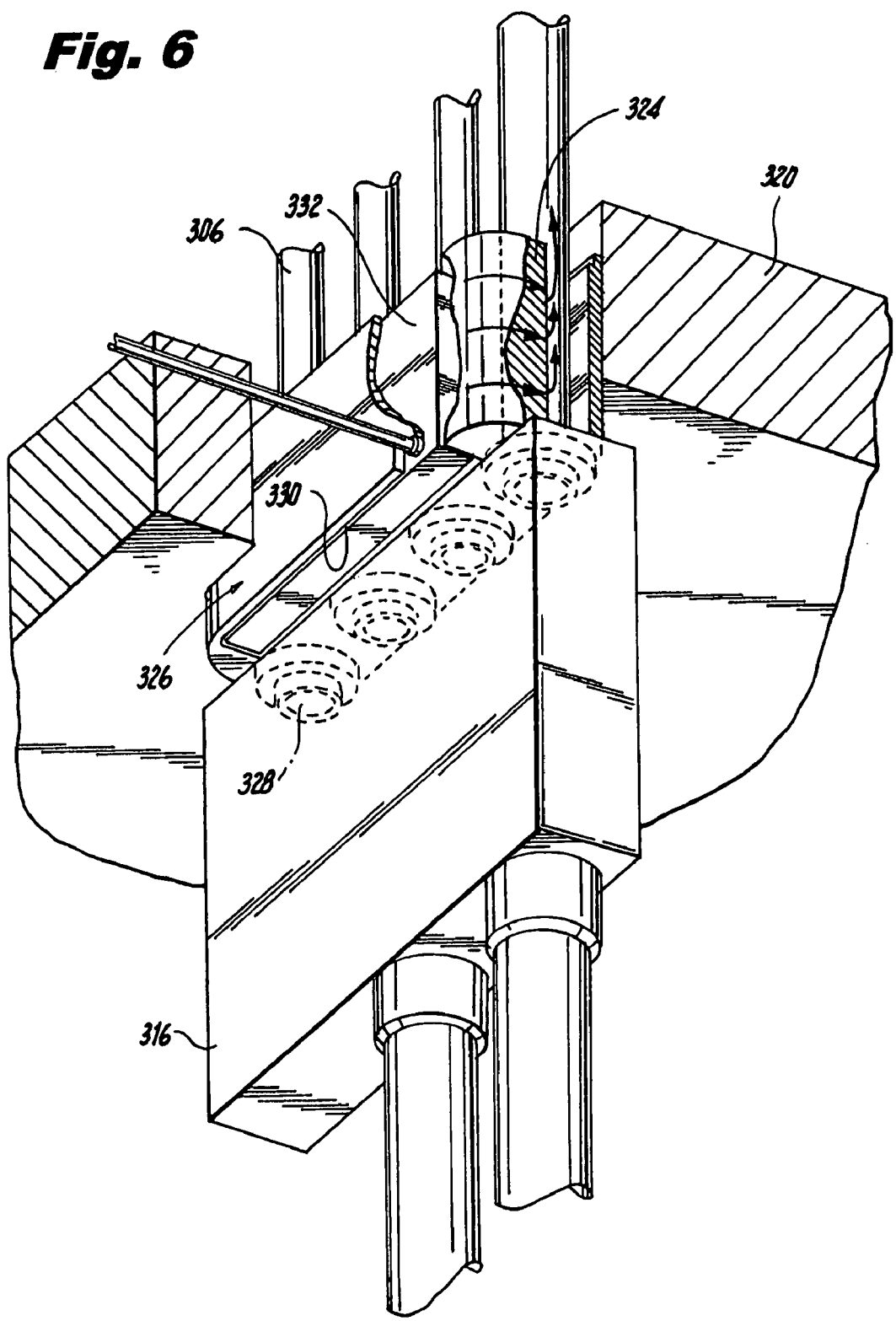
FIG. 6 is a perspective view of the isolation bracket of FIG. 4, showing the isolation bracket supporting the pneumatic lines, and showing how heat can flow from a heater in the isolation bracket into the pneumatic lines.
Figure 8A:
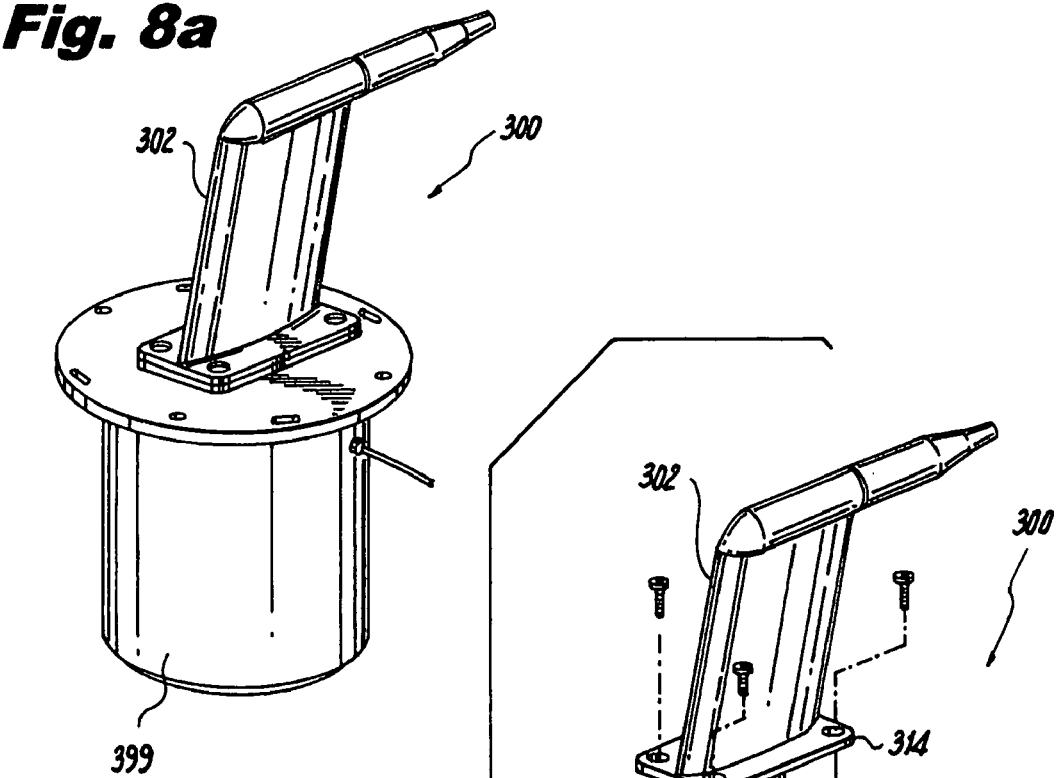
FIG. 8a is a perspective view of the air data probe of FIG. 4, including a housing adapted for mounting on an aircraft.
Figure 8B:
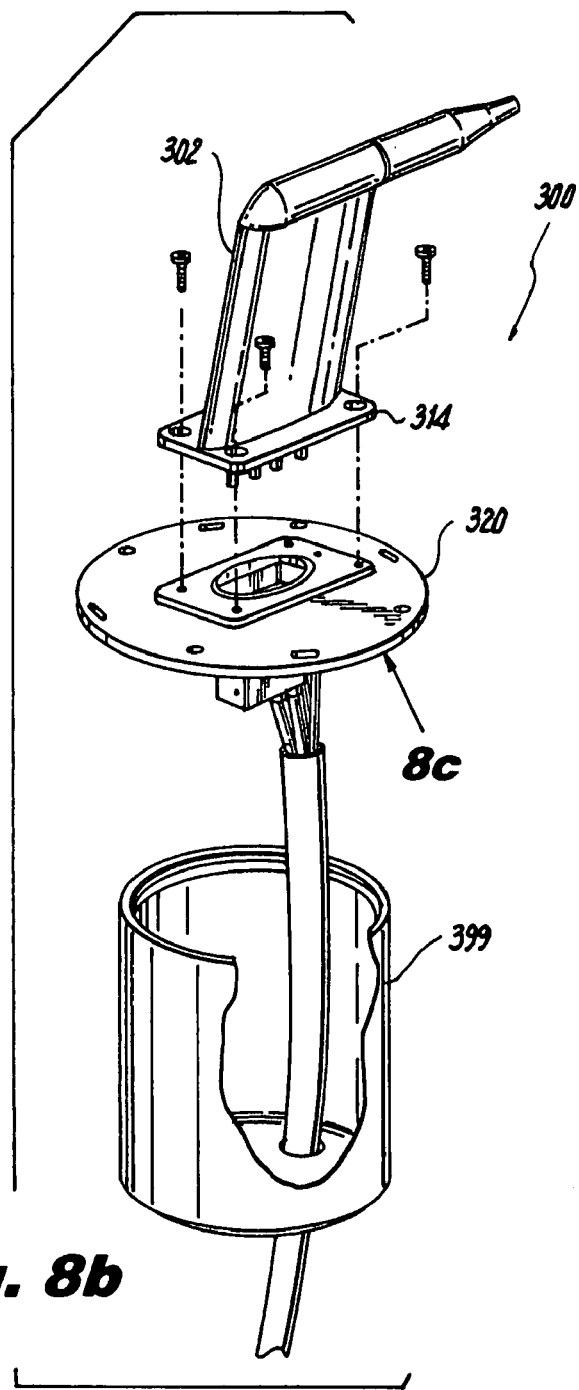
FIG. 8b is an exploded perspective view of the air data probe of FIG. 8a, showing how the baseplate connects to the faceplate, which in turn connects to the housing and the aircraft.
Figure 8C:
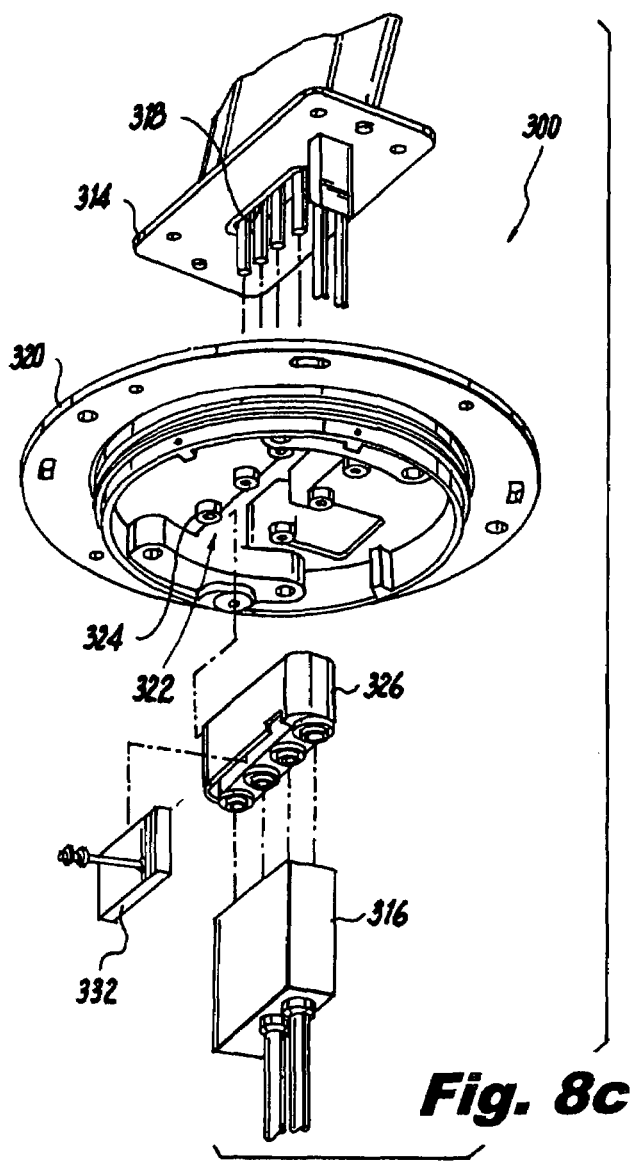
FIG. 8c is an exploded perspective view of a portion of the air data probe of FIG. 8a, showing how the pneumatic lines, isolation bracket, heater body, and manifold can be connected through isolation bores in the baseplate and faceplate.

With reference now to FIGS. 8a-8d, the air data probe 300 of FIGS. 4-6 is shown with housing 399. FIG. 8a shows probe 300 assembled with housing 399 and ready for attachment to an aircraft. FIG. 8b shows probe 300 in an exploded view showing the relationships between strut 302, baseplate 314, faceplate 320, and housing 399. FIG. 8c is an exploded view of a portion of probe 300 showing in particular how manifold 316, heating body 332, isolation bracket 326, faceplate 320, and baseplate 314 fit together.

Figure 8D:
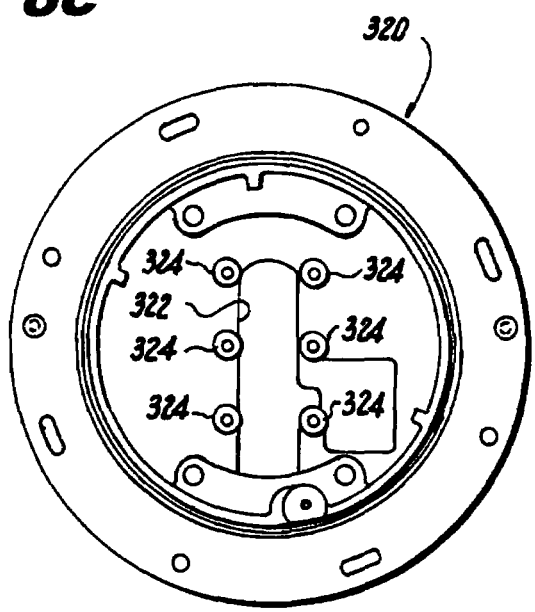
FIG. 8d is a bottom view of a faceplate of FIG. 4, showing the standoffs for increasing thermal isolation of the pneumatic lines.

FIG. 8d shows the bottom of faceplate 320. In order to reduce thermal conduction between probe 300 and the exterior of the aircraft, faceplate 320 can be insolated from the nearby components by making contact through small standoffs 324. In conjunction with or in lieu of standoffs 324, faceplate 320 could be thermally isolated from the other components by a thermally insulative coating on faceplate 320, or by placing a gasket between faceplate 320 and the other components and/or aircraft skin.

It will be readily apparent to those skilled in the art to which the invention appertains that manifold 316 and faceplate 320 are optional features. The invention can be practiced without these features, for example by attaching baseplate 314 directly to other aircraft components as is traditional in the art, without including a faceplate (as shown for example in FIGS. 2a-2c). Further, the invention can readily be practiced in traditional probes that do not have a manifold in close proximity to the strut, as described above, without departing from the spirit and scope of the invention. Such traditional probes also benefit from thermal isolation of pneumatic lines in accordance with the invention.

In accordance with another aspect of the invention, a method of thermally isolating at least one pneumatic line in an aircraft probe is provided. The method includes the step of providing a strut having a probe head extending therefrom and a baseplate for attaching the strut to the aircraft, wherein the strut has an interior passage configured to accommodate at least one pneumatic line. The method also includes the steps of forming an isolation bore in the baseplate to communicate with the interior passage of the strut, positioning at least one pneumatic line within the interior passage of the strut in such a manner so that the at least one pneumatic line communicates with at least one inlet opening in the probe head, and supporting the at least one pneumatic line within the isolation bore to thermally isolate the at least one pneumatic line from the baseplate.

Figure 1B:
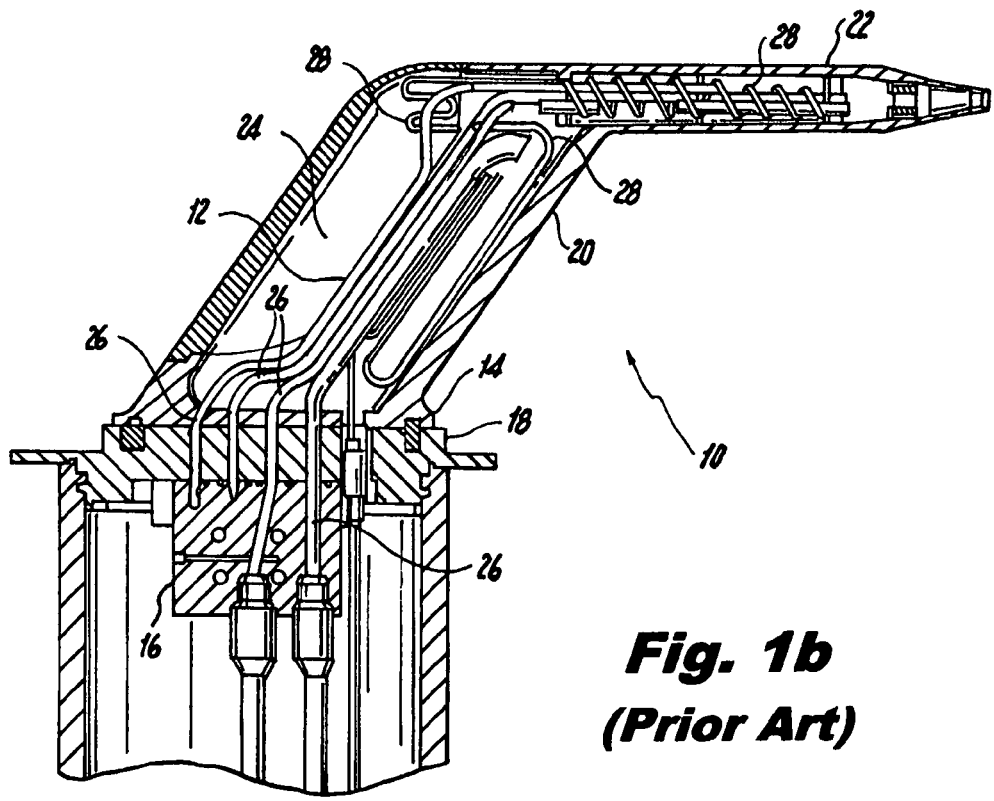
FIG. 1b is a cross-sectional view of the prior art air data probe of FIG. 1a showing the pneumatic lines communicating with the manifold through bores in the baseplate and faceplate.

Referring to FIGS. 1a-1b, the method includes the step of providing a strut, such as strut 20 for example, having a probe head (such as probe head 22), and an interior passage (such as internal passage 24) accommodating at least one pneumatic line (such as pneumatic lines 12), as described above. The strut provided also has a baseplate, such as baseplate 14 of the prior art.

As depicted in FIGS. 2-8, the forming step includes forming an isolation bore (such as isolation bores 118, 218, 318, and 618) in the baseplate so that the isolation bore communicates with the interior passage of the strut. Those skilled in the art will readily appreciate that the isolation bore can be formed, for example, by removing material from the baseplate as by machining, drilling, milling, etching, or any other suitable process. Alternatively, the isolation bore can be formed integrally within the baseplate, as in casting, molding, stamping, or any other suitable process. Moreover, it is also contemplated that the isolation bore can be coated with a thermally insulative material without departing from the spirit and scope of the invention.

It is also possible for the method to include further steps of positioning at least one pneumatic line within the interior passage of the strut in such a manner so that the at least one pneumatic line communicates with at least one inlet opening in the probe head, and supporting the at least one pneumatic line within the isolation bore to thermally isolate the at least one pneumatic line from the baseplate.

As depicted in FIGS. 1-8, the positioning step includes positioning at least one pneumatic line (such as pneumatic lines 12, 106, 206, 306, and 606) within the interior passage of the strut in such a manner so that the at least one pneumatic line communicates with at least one inlet opening in the probe head (such as inlet openings 110, 112, 210, 212). The step of supporting the at least one pneumatic line includes brazing, soldering, welding, wiring, or using any other suitable method for joining the at least one pneumatic line to the interior of the probe head, interior passage, or other nearby structures (as shown, for example, in FIGS. 2a-2c).

Those skilled in the art will readily appreciate that it is also possible to optionally provide a faceplate (such as faceplate 18) configured and adapted to attach the baseplate to an aircraft and to form a second isolation bore (such as second isolation bores 222, 322, and 622) in the faceplate, wherein the second isolation bore is configured to be aligned with the isolation bore in the baseplate to thermally isolate the at least one pneumatic line from the faceplate. Moreover, the step of supporting can include supporting the at least one pneumatic lines within an isolation bracket (such as isolation bracket 326) positioned within an isolation bore (such as isolation bore 118, 218, 318, 618 and/or a second isolation bore such as bores 222, 322, and 622). Further, a manifold (such as manifolds 16, 116, 216, 316, and 616) can optionally be provided in proximity to the strut for communicating with the at least one pneumatic line. The manifold is preferably configured and adapted to be thermally isolated from the faceplate and baseplate, as described above. Alternatively, the invention can be practiced with pressure fittings located within the aircraft in lieu of having a manifold in proximity to the strut, as explained above. It is also contemplated that the manifold can provide support to the at least one pneumatic line in embodiments without an isolation bracket, and in embodiments with an isolation bracket, it is contemplated that the manifold can have a sealing interface with the isolation bracket and the at least one pneumatic line.

While the apparatus and methods of the subject invention have been shown and described with reference to preferred embodiments, those skilled in the art will readily appreciate that various changes and/or modifications may be made thereto without departing from the spirit and scope of the subject invention as defined by the appended claims.

What is claimed is:

1. A probe for an aircraft comprising:
   a) a strut having an interior passage accommodating a plurality of pneumatic lines;
   b) a probe head extending from the strut and having at least one inlet opening communicating with the pneumatic lines;
   c) a baseplate below the strut for attaching the probe to the aircraft; and
   d) a manifold below the baseplate for communicating with the pneumatic lines, wherein the baseplate is adapted and configured so that the pneumatic lines communicating with the manifold are thermally isolated from the baseplate.

2. A probe as recited in claim 1, wherein an isolation bore is formed in the baseplate to thermally isolate the pneumatic lines from the baseplate.

3. A probe as recited in claim 2, further comprising a faceplate configured to connect the baseplate to the aircraft.

4. A probe as recited in claim 3, wherein the faceplate includes a second isolation bore aligned with the isolation bore in the baseplate.

5. A probe as recited in claim 4, wherein the faceplate includes means for connecting the faceplate to the aircraft, said means being configured to minimize thermal conduction between the aircraft and the faceplate.

6. A probe as recited in claim 4, further comprising means adjacent to the isolation bore in the faceplate for heating the pneumatic lines.

7. A probe as recited in claim 6, wherein the heating means self-regulates power consumption.

8. A probe as recited in claim 4, further comprising an isolation bracket disposed within the isolation bore of the faceplate for supporting the pneumatic lines.

9. A probe as recited in claim 8, wherein a plurality of support bores are formed in the isolation bracket, each for supporting a corresponding one of said pneumatic lines.

10. A probe as recited in claim 9, wherein the isolation bracket includes means for heating the pneumatic lines.

11. A probe as recited in claim 10, wherein at least one support bore has a thermally conducting fin extending therefrom for transferring heat to the corresponding one of said pneumatic lines.

12. A probe as recited in claim 11, wherein the heating means self-regulates power consumption.

13. A probe as recited in claim 12, wherein at least a portion of the isolation bracket is formed from stainless steel.

14. A probe as recited in claim 8, wherein the manifold and the isolation bracket cooperate to form a sealing interface for the pneumatic lines.

15. A probe as recited in claim 14, wherein the manifold is thermally isolated from the faceplate.

16. A method of thermally isolating at least one pneumatic line in an aircraft probe, comprising steps of:
 a) providing a strut having a probe head extending therefrom and a baseplate for attaching the strut to the aircraft, wherein the strut has an interior passage configured to accommodate at least one pneumatic line;
 b) forming an isolation bore in the baseplate to communicate with the interior passage of the strut;
 c) positioning at least one pneumatic line within the interior passage of the strut in such a manner so that the at least one pneumatic line communicates with at least one inlet opening in the probe head; and
 d) supporting the at least one pneumatic line within the isolation bore to thermally isolate the at least one pneumatic line from the baseplate.

17. A method as in claim 16, further comprising steps of:
 a) providing a faceplate configured and adapted to attach the baseplate to an aircraft; and
 b) forming a second isolation bore in the faceplate, wherein the second isolation bore is configured to be aligned with the isolation bore in the baseplate to thermally isolate the at least one pneumatic line from the faceplate.

18. A method as in claim 17, wherein the step of supporting includes positioning an isolation bracket within the isolation bore of the faceplate to support the at least one pneumatic line.

19. A method as in claim 18, further comprising steps of:
 a) providing a manifold for communicating with the at least one pneumatic line, wherein the manifold is configured and adapted to be thermally isolated from the faceplate and baseplate; and
 b) sealing the manifold to the at least one pneumatic line.

20. A probe for an aircraft comprising:
 a) a strut having an interior passage accommodating a plurality of pneumatic lines;
 b) a probe head extending from the strut and having at least one inlet opening communicating with the pneumatic lines; and
 c) a baseplate below the strut for attaching the probe to the aircraft, wherein the baseplate is adapted and configured so that the pneumatic lines passing therethrough are thermally isolated therefrom.

21. A probe as recited in claim 20, further comprising a manifold below the baseplate for communicating with the pneumatic lines.

* * * * *